United States Patent
Bakshi et al.

(10) Patent No.: US 7,706,799 B2
(45) Date of Patent: Apr. 27, 2010

(54) REDUCED WIRELESS CONTEXT CACHING APPARATUS, SYSTEMS, AND METHODS

(75) Inventors: Sanjay Bakshi, Beaverton, OR (US); Jesse R. Walker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 841 days.

(21) Appl. No.: 11/389,322

(22) Filed: Mar. 24, 2006

(65) Prior Publication Data

US 2007/0224986 A1 Sep. 27, 2007

(51) Int. Cl.
*H04W 36/00* (2009.01)
(52) U.S. Cl. .............. 455/436; 340/572.7; 375/240.02; 700/1; 710/104; 725/135; 709/203; 709/223
(58) Field of Classification Search .............. 455/436; 375/240.2; 341/50, 107; 340/572.7; 700/1; 709/22, 201, 223; 710/104; 725/135; 717/151
See application file for complete search history.

(56) References Cited

U.S. PATENT DOCUMENTS

| | | | | | |
|---|---|---|---|---|---|
| 5,901,058 | A | * | 5/1999 | Steinman et al. | 700/1 |
| 6,037,870 | A | * | 3/2000 | Alessandro | 340/572.1 |
| 7,062,580 | B2 | * | 6/2006 | Donaires | 710/104 |
| 7,245,242 | B2 | * | 7/2007 | Hu et al. | 341/107 |
| 7,318,090 | B1 | * | 1/2008 | Fairman et al. | 709/223 |
| 2002/0183726 | A1 | * | 12/2002 | Elbrecht et al. | 606/6 |
| 2004/0059851 | A1 | * | 3/2004 | Donaires | 710/104 |
| 2005/0273839 | A1 | * | 12/2005 | Mikkonen et al. | 725/135 |
| 2005/0283771 | A1 | * | 12/2005 | Paller | 717/151 |
| 2006/0089963 | A1 | * | 4/2006 | Vollmer et al. | 709/201 |
| 2007/0120711 | A1 | * | 5/2007 | Hu et al. | 341/50 |
| 2007/0224986 | A1 | * | 9/2007 | Bakshi et al. | 455/436 |
| 2007/0230570 | A1 | * | 10/2007 | Hu et al. | 375/240.02 |
| 2008/0024307 | A1 | * | 1/2008 | Wissendheit et al. | 340/572.7 |

FOREIGN PATENT DOCUMENTS

WO WO-2005/074315 A1 8/2005
WO WO-2007/112223 A1 10/2007

OTHER PUBLICATIONS

"IEEE Standard for Local and Metropolitan Area Networks Part 16: Air Interface for Fixed and Mobile Broadband wireless Access Systems—Amendment 2: Physical and Medium Access Control Layers for Combined Fixed and Mobile Operation in Licensed Bands and Corrigendum 1", IEEE Std. 802.16e™ —2005 and IEEE Std. 802.16™ -2004/Cor1-2005, © 2006 by the Institute of Electrical and Electronics Engineers, Inc., (Feb. 2006), 864 pgs.

"PCT Application No. PCT/US2007/064265, International Search Report mailed Aug. 8, 2007", 4 pgs.

"PCT Application No. PCT/US2007/064265, Written Opinion mailed Aug. 8, 2007", 7 pgs.

* cited by examiner

*Primary Examiner*—William D Cumming
(74) *Attorney, Agent, or Firm*—Schwegman, Lundberg & Woessner, P.A.

(57) ABSTRACT

Replay counter cache reduction mechanisms are described herein.

25 Claims, 4 Drawing Sheets

REDUCED WIRELESS CONTEXT CACHING APPARATUS, SYSTEMS, AND METHODS

TECHNICAL FIELD

Various embodiments described herein relate to digital communications generally, including apparatus, systems, and methods used in wireless communications.

BACKGROUND INFORMATION

An evolving family of standards is being developed by the Institute of Electrical and Electronic Engineers (IEEE) to define parameters of a point-to-multipoint wireless, packet-switched communications system. In particular, the 802.16 family of standards (e.g., the IEEE std. 802.16-2004 (published Sep. 18, 2004)) may provide for fixed, portable, and/or mobile broadband wireless access networks. Additional information regarding the IEEE 802.16 standard may be found in IEEE Standard for Local and Metropolitan Area Networks—Part 16: Air Interface for Fixed Broadband Wireless Access Systems (published Oct. 1, 2004). See also IEEE 802.16E-2005, IEEE Standard for Local and Metropolitan Area Networks—Part 16: Air Interface for Fixed and Mobile Broadband Wireless Access Systems—Amendment for Physical and Medium Access Control Layers for Combined Fixed and Mobile Operation in Licensed Bands (published Feb. 28, 2006). Further, the Worldwide Interoperability for Microwave Access (WiMAX) Forum facilitates the deployment of broadband wireless networks based on the IEEE 802.16 standards. For convenience, the terms "802.16" and "WiMAX" may be used interchangeably throughout this disclosure to refer to the IEEE 802.16 suite of air interface standards.

WiMax technology may support a high-speed seamless handoff of a mobile station (MS) from a source base station (BS) to a target BS while maintaining subscriber and network security. Security mechanisms may include an automatic key derivation in which an authentication key (AK) for the target BS is derived by both the MS and by the target BS prior to a handoff, while the MS remains connected to the source BS. This may avoid a lengthy and time-consuming authentication, authorization, and accounting (AAA) session at the handoff. A seamless, low-latency handoff may result.

The process of deriving the AK automatically at both the target BS and at the MS from a parent key (e.g., from a pairwise master key, or "PMK") may create a fresh context associated with the derived AK (e.g., an AK context). Protocol rules may establish that the AK context may be derived only once per BS and PMK, and that the single AK context may be used until the PMK expires. If an AK context was created more than once for a given AK, a replay attack security hole may be created.

In accordance with WiMAX standards and/or protocols, AKs and AK contexts may be cached until the corresponding PMK becomes invalid. In one example, a PMK may be valid for several days in some networks. An AK context may comprise a 32-bit uplink packet number (PN) and a 32-bit downlink PN. The size of an AK cache may grow quite large because it may contain AKs and AK contexts belonging to MSs currently active in the network and to MSs that have left the network but continue to maintain valid PMKs. These potentially large caching requirements may lead to a large memory requirement in the BS and to costs associated therewith. Similarly, an MS needs to cache AKs and AK contexts for BSs that it has visited previously and for which it continues to maintain a valid PMK. The memory requirement is also increased for an MS because the MS may visit many BSs during a PMK's lifetime.

DETAILED DESCRIPTION

Figure 1:
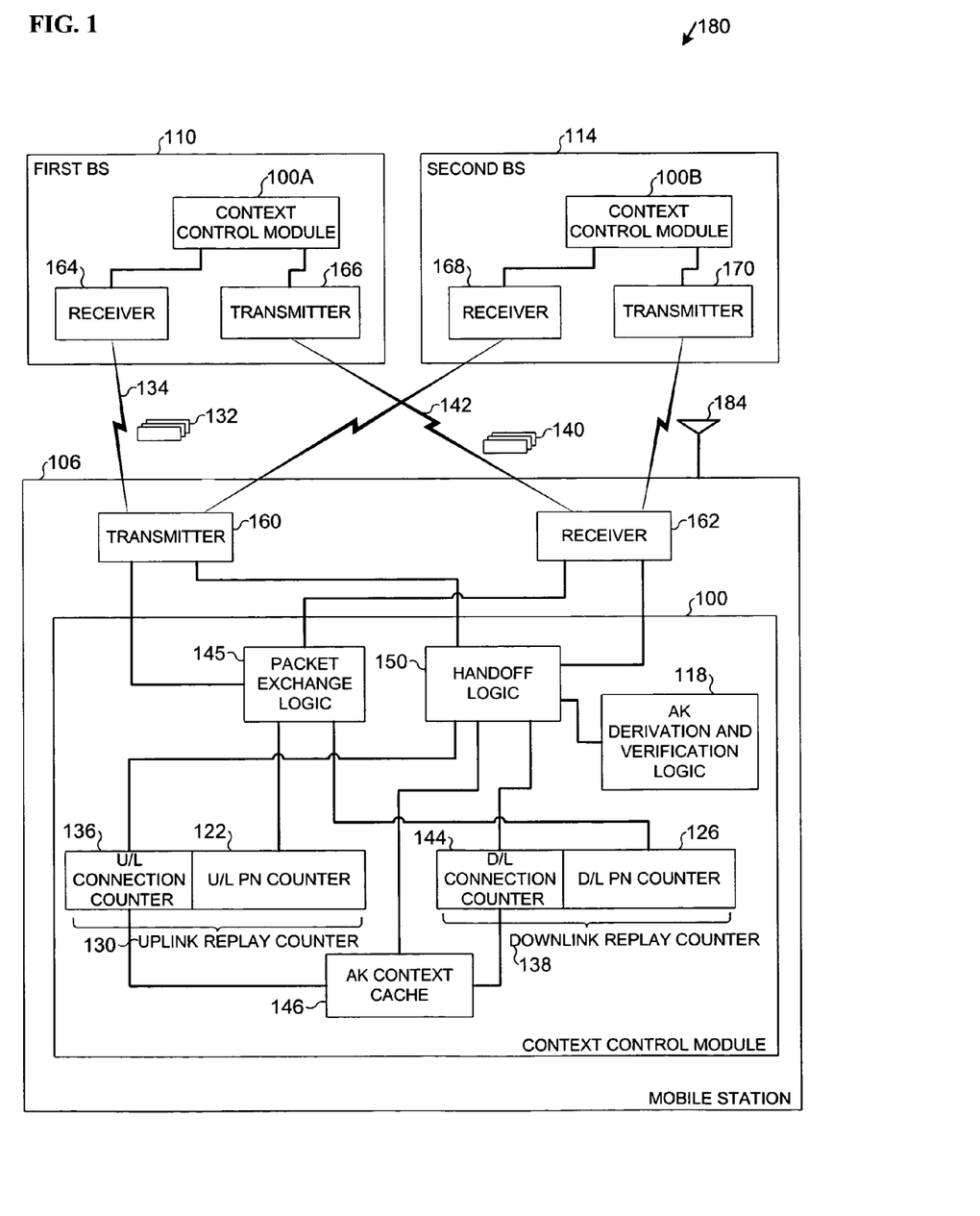
FIG. 1 is a block diagram of a context control module and a representative system according to various embodiments.

FIG. 1 comprises a block diagram of a context control module (CCM) 100 and a system 180 according to various embodiments of the invention. Embodiments herein may reduce an amount of AK context information required to be cached as an MS 106 is handed off from a first BS 110 to a second BS 114, without compromising security or introducing additional security risks. The MS 106, the BS 110, and the BS 114 may be capable of operating according to an IEEE 802.11 family of standards and/or according to an IEEE 802.16 family of standards.

Some embodiments of the system 180 may support a secure, high-speed seamless handoff as previously described. An automatic key derivation associated with the handoff may be defined in which an authentication key (AK) for a target BS (e.g., the second BS 114) is derived by both the target BS and by the MS 106 while the MS 106 remains connected to a source BS (e.g., the BS 110). An AK derivation and verification logic 118 may operate to maintain the AK for as long as cryptographic material used to generate the AK does not change regardless of how many times the AK derivation formula is invoked. The AK derivation and verification logic 118 may also verify messages received on the downlink for correct signatures.

The AK derivation and verification logic 118 may enable the MS 106 to be handed off without a need to perform a lengthy and time-consuming fresh authentication sequence. The AK derivation and verification logic 118 may create an AK context for the derived AK at both the associated BS and at the MS 106, as previously described. Among other attributes, the AK context may comprise contents of an uplink (U/L) packet number (PN) counter 122 and contents of a downlink (D/L) packet number (PN) counter 126. The uplink PN counter 122 and the downlink PN counter 126 may each comprise a four-byte sequential counter. The uplink and downlink PN counters 122 and 126 may be incremented to create uplink and downlink message signatures to be appended to uplink messages transmitted by the MS 106 and to downlink messages transmitted by the associated BS, respectively.

The contents of the uplink and downlink PN counters 122 and 126 may be unique for each signed message. A given tuple {uplink or downlink PN, AK} may be used only once to prevent a security hole that could subject the system 180 to a replay attack. Validity may be indicated at each end of a communications link by examining contents of the uplink and downlink PN counters 122 and 126. These contents may be used by both the MS 106 and the associated BS for signing uplink and downlink messages. Values of the PN counters 122 and 126 may be incremented from the values used for a previous message transmission or reception, respectively. A signature appended to a received message may be verified.

The CCM 100 may include an uplink replay counter 130 to track one or more packet sequences 132 on an uplink 134. The uplink replay counter 130 may comprise the uplink packet number counter 122 and an uplink connection counter 136. The CCM 100 may also include a downlink replay counter 138 to track one or more packet sequences 140 on a downlink 142. The downlink replay counter 138 may comprise the downlink packet number counter 126 and a downlink connection counter 144.

A packet exchange logic 145 in the CCM 100 may increment the uplink packet number counter 122 as each packet is transmitted on the uplink 134. The packet exchange logic 145 may also increment the downlink packet number counter 126 as each packet is received on the downlink 142.

An AK context cache 146 may be coupled to the uplink replay counter 130 and to the downlink replay counter 138. The AK context cache 146 may cache a subset of the contents of the uplink replay counter 130, a subset of the contents of the downlink replay counter 138, or both prior to handing off the MS 106 from the first BS 110 to the second BS 114. The cached subset of the contents of the uplink replay counter 130, the downlink replay counter 138, or both may be retrieved from the AK context cache 146. The retrieval may occur upon a handoff of the MS 106 back to the first BS 110, and may provide replay security without requiring a time-consuming fresh authentication sequence.

Caching a subset of the contents of the replay counters 130 and 138 rather than the full counters as an AK context may reduce caching resources. Substantial savings may result in a system comprising many MSs handing off frequently between many BSs.

The CCM 100 may also include handoff logic 150 to increment the uplink connection counter 136 and the downlink connection counter 144. The handoff logic 150 may reset both the uplink packet number counter 122 and the downlink packet number counter 126 upon each successful handoff of the MS 106. The handoff logic 150 may also retrieve contents of the AK context cache 146 upon a handoff of the MS 106 back to the first BS 110.

In another embodiment, a system 180 may include one or more of the CCM 100, as previously described. A CCM 100 may be included as a component of an MS 106, of a first BS 110, and/or of a second BS 114. For example, the CCM 100 in the MS 106 may interoperate with a CCM 100A in the first BS 110 and with a CCM 100B in the second BS 114. The CCMs 100, 100A, and 100B may interoperate to facilitate a secure handoff of the MS 106 to the first BS 110 or to the second BS 114 without requiring a time-consuming fresh authentication sequence.

The system 180 may also include an antenna 184 attached to the MS 106 to facilitate communications with the first BS 110 and with the second BS 114. The antenna 184 may comprise a patch antenna, an omnidirectional antenna, a beam antenna, a slot antenna, a monopole antenna, or a dipole antenna, among other types. The MS 106 may include a transmitter 160 and a receiver 162. The transmitter 160 and the receiver 162 may be operatively coupled to the antenna 184. The first BS 110 may include a receiver 164 and a transmitter 166. The receiver 164 and the transmitter 166 may enable communications between the first BS 110 and the MS 106. The second BS 114 may include a receiver 168 and a transmitter 170. The receiver 168 and the transmitter 170 may enable communications between the second BS 114 and the MS 106.

Any of the components previously described can be implemented in a number of ways, including embodiments in software. Thus, the CCMs 100, 100A, 100B; MS 106; BSs 110, 114; AK derivation and verification logic 118; PN counters 122, 126; replay counters 130, 138; packet sequences 132, 140; uplink 134; connection counters 136, 144; downlink 142; packet exchange logic 145; AK context cache 146; handoff logic 150; system 180; and antenna 184 may all be characterized as "modules" herein.

The modules may include hardware circuitry, single or multi-processor circuits, memory circuits, software program modules and objects, firmware, and combinations thereof, as desired by the architect of the CCM 100 and the system 180 and as appropriate for particular implementations of various embodiments.

The apparatus and systems of various embodiments may be useful in applications other than reducing an amount of AK context information required to be cached as an MS is handed off from one BS to another without compromising security or introducing additional security risks. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

Figure 2:
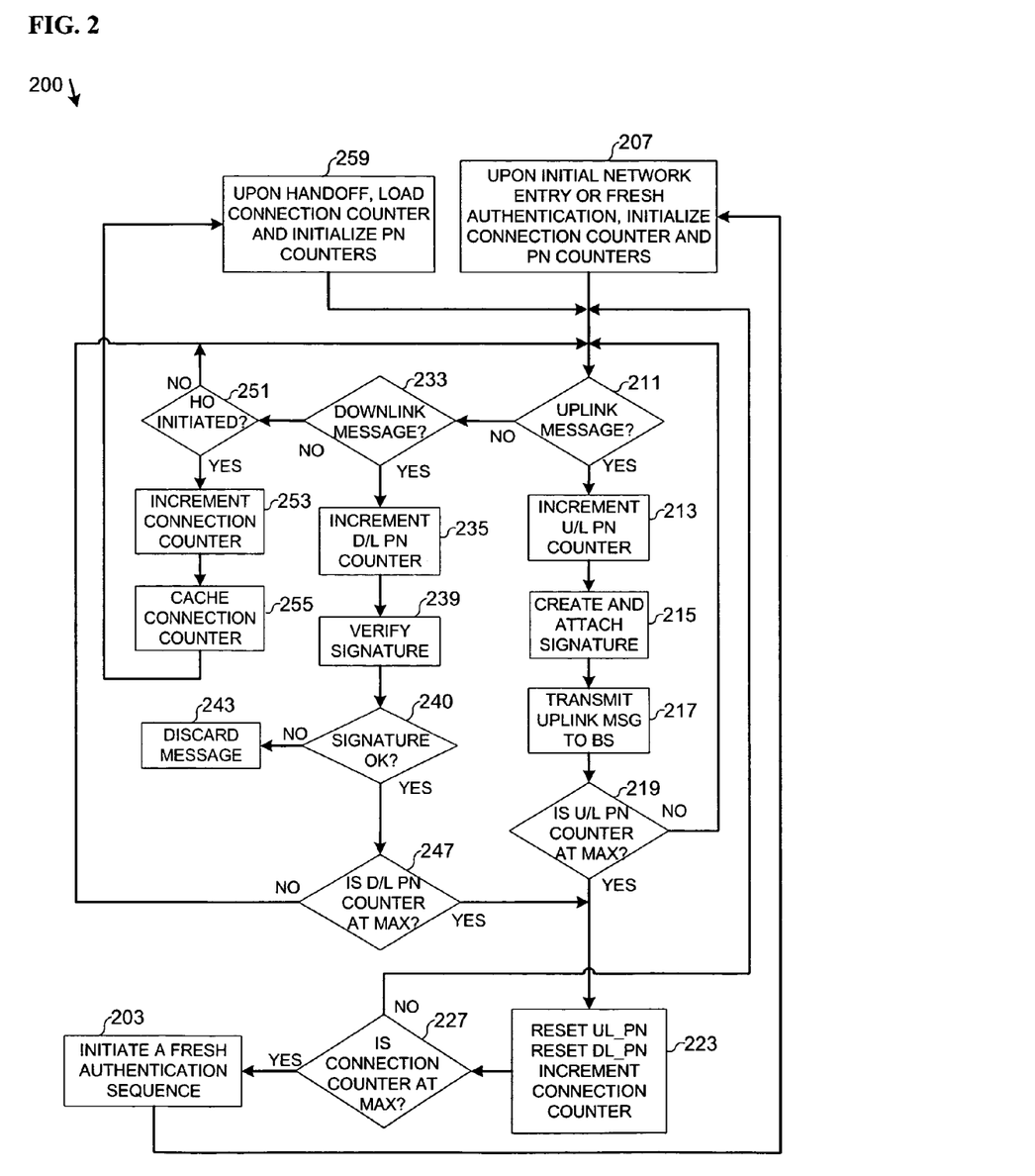
FIG. 2 is a flow diagram illustrating several methods according to various embodiments.

FIG. 2 is a flow diagram illustrating several methods according to various embodiments. A method 200 may enable a secure, high-speed seamless handoff of an MS from a first BS to a second BS in a wireless, packet-switched network. The method 200 may commence at block 203 with performing a fresh authentication sequence at the MS. The authentication sequence may comprise an authentication, authorization, and accounting (AAA) session, among other authentication techniques. The AAA session may utilize an extensible authentication protocol (EAP).

The method 200 may continue at block 207 with initializing an uplink packet number counter (U/L PN counter), a downlink packet number counter (D/L PN counter), and one or more connection counters in the MS. The uplink and downlink packet number counters may increment each time a packet is transmitted from the MS or received by the MS, respectively. The connection counter(s) may increment each time the MS is handed off from one BS to another BS or when the U/L PN counter, the D/L PN counter, or both reach a maximum value and roll over. Some embodiments may include independent connection counters for the uplink and the downlink, respectively. Other embodiments may incorporate a single connection counter, since a handoff should increment both an uplink connection counter and a downlink connection counter. Hereinafter the connection counter(s) will be referred to in the singular, in the interest of clarity.

The method 200 may determine whether to send an uplink message, at block 211. If so, the U/L PN counter may be incremented, at block 213. An authentication signature may be created using cryptographic material obtained from the fresh authentication sequence at block 215. The authentication signature may be appended to the message to be sent on the uplink, at block 215. The message may then be transmitted to a base station on the uplink, at block 217.

The method 200 may include testing whether the U/L PN counter has reached a maximum uplink packet count, at block 219. If not, the method 200 may again test for a pending message to be sent on the uplink, at block 211. If the U/L PN counter has reached the maximum uplink packet count, both the U/L PN counter and the D/L PN counter may be reset, and the connection counter may be incremented, at block 223.

The method 200 may continue at block 227 to determine whether the connection counter has reached a maximum number of handoffs recordable using the connection counter. Alternatively, the method 200 may determine whether the connection counter has reached a predefined handoff threshold at block 227. If the connection counter has not reached capacity, the method 200 may again test for a pending message to be sent on the uplink, at block 211. If the connection counter is at maximum capacity, the method 200 may initiate a fresh authentication sequence, at block 203.

If the test at block 211 finds that no uplink message is pending, the method 200 may test for a message received on the downlink, at block 233. If a downlink message is received, the D/L PN counter may be incremented, at block 235. An authentication signature associated with the message may be verified, at block 239. If the signature is invalid at block 240, the method 200 may discard the received message, at block 243. Otherwise if the signature is valid at block 240 the method 200 may test whether the D/L PN counter has reached a maximum downlink packet count, at block 247. If the D/L PN counter has not reached the maximum downlink packet count, the method 200 may again test for a pending message to be sent on the uplink, at block 211. If the D/L PN counter has reached the maximum downlink packet count, the method 200 may continue at block 223 as previously described.

If no messages are pending on either the uplink or the downlink, the method 200 may test to determine whether a handoff of the MS has been initiated, at block 251. If a handoff of the MS has not been initiated, the method 200 may again test for a pending message to be sent on the uplink, at block 211. If a handoff of the MS has been initiated, the method 200 may increment the connection counter, at block 253. The connection counter contents may also be cached, at block 255.

The method 200 may continue at block 259 with initiating a subsequent connection iteration. The MS may have been previously associated with the first BS, for example, and may have cached a subset of an AK context (e.g., contents of a connection counter) from that previous association. At a handoff of the MS from the second BS back to the first BS, the connection counter at the MS may be loaded from the cache. Both the U/L PN counter and the D/L PN counter may be reset to an initial value. Accordingly, the method 200 may proceed to block 211 as described in detail above.

Figure 3:
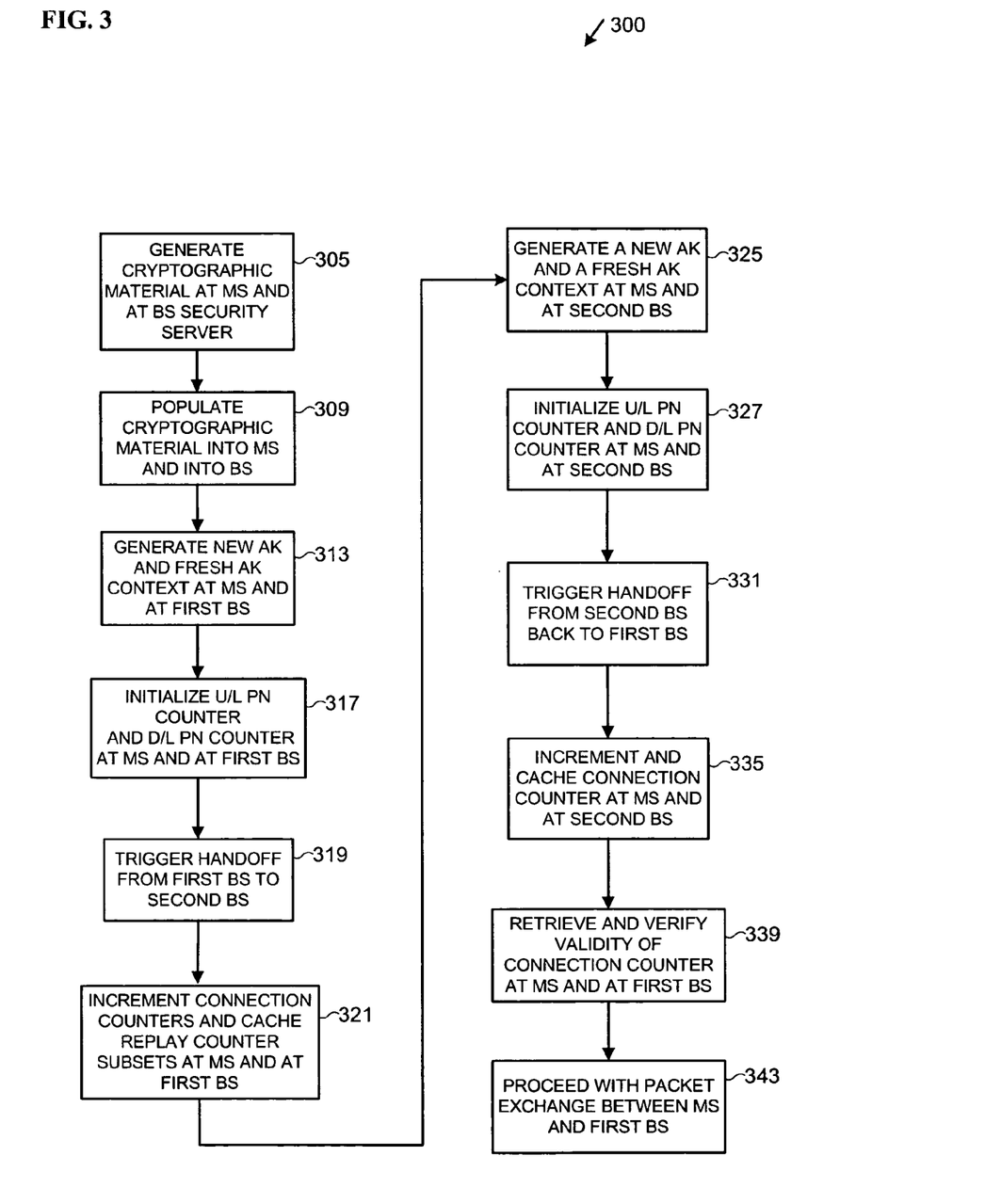
FIG. 3 is a flow diagram illustrating several methods according to various embodiments.

FIG. 3 is a flow diagram of a method 300 illustrating an example handoff sequence. After initial network discovery, BS selection, and authentication, the method 300 may commence at block 305 with creating root cryptographic material required to generate AKs for one or more BSs in a network. The root cryptographic material may be populated into both the MS and into a security server common to the BS(s), at block 309. The BS(s) may request AKs and AK contexts from the security server.

The method 300 may also include generating a new AK and an associated fresh AK context at the MS and at a first BS to which the MS has associated, at block 313. The AK and AK context may be generated from the cryptographic material created at block 305. The U/L PN counter and the D/L PN counter may both be initialized to a known value (e.g., to one), at block 317.

After exchanging several uplink and downlink signed messages, a handoff may be triggered from the first BS to a second BS, at block 319. The method 300 may include incrementing a connection counter and caching a subset of contents of replay counters at both the MS and at the first BS, at block 321. The replay counters may associate the MS with the first BS.

Each replay counter may comprise an uplink packet number counter operating cooperatively with an uplink connection counter or a downlink packet number counter operating cooperatively with a downlink connection counter. Subsets of the contents of the replay counters may comprise contents of an uplink connection counter at each end of the uplink and/or contents of a downlink connection counter at each end of the downlink. The uplink and downlink connection counters should always be synchronized. Therefore, some embodiments may consolidate the uplink and downlink connection counters into a single common connection counter at the MS and into a single common connection counter at the first BS.

During the handoff from the first BS to the second BS, both the MS and the second BS may generate a new AK and an associated fresh AK context, at block 325. Both the U/L PN counter and the D/L PN counter may be initialized to a known value (e.g., to one), at block 327. After exchanging several uplink and downlink signed messages, a handoff may be triggered from the second BS back to the first BS, at block 331. The method 300 may include incrementing and caching the connection counters associating the MS with the second BS at both the MS and at the second BS, at block 335.

During the handoff of the MS from the second BS back to the first BS, both the MS and the first BS may retrieve the cached AK contexts (e.g., cached connection counters) and verify that the retrieved values are valid, at block 339. Packet exchange may proceed between the MS and the first BS without having to generate a new AK, at block 343.

The method 300 may thus avoid having to perform a full, time-consuming authentication session when a BS is revisited prior an expiration of an AK corresponding to a relationship between the MS and the revisited BS. The method 300 may conserve substantial caching resources by caching only the connection counter subset of the entire AK context. Using a 10-bit connection counter as an example, a savings of (54 bits saved/64 bits without the savings) or about 84% may result.

It may be possible to execute the activities described herein in an order other than the order described. And, various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 4 below.

Figure 4:
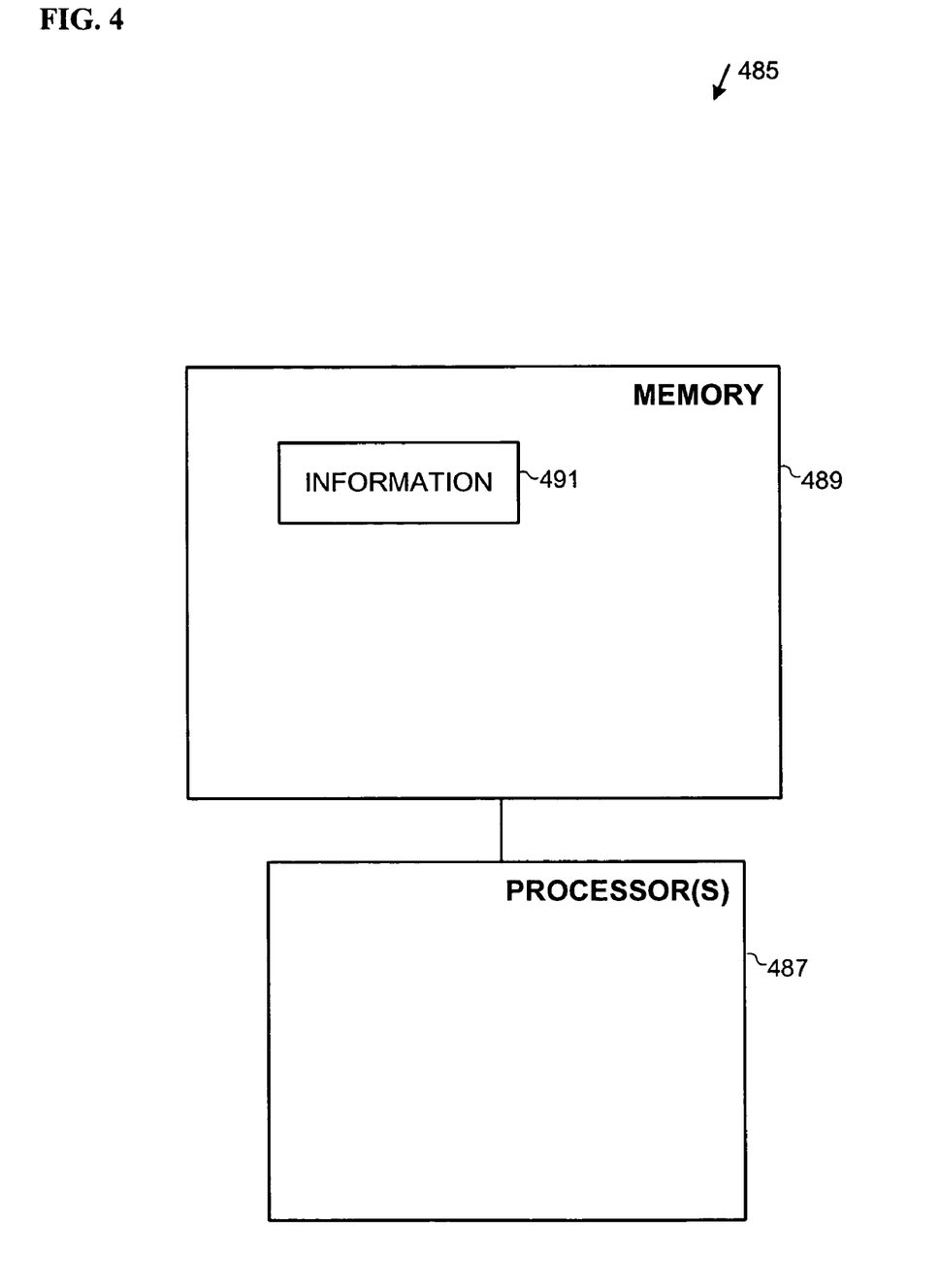
FIG. 4 is a block diagram of an article according to various embodiments.

FIG. 4 is a block diagram of an article 485 according to various embodiments of the invention. Examples of such embodiments may comprise a computer, a memory system, a magnetic or optical disk, some other storage device, or any type of electronic device or system. The article 485 may include one or more processor(s) 487 coupled to a machine-accessible medium such as a memory 489 (e.g., a memory including electrical, or optical elements). The medium may contain associated information 491 (e.g., computer program instructions, data, or both) which, when accessed, results in a machine (e.g., the processor(s) 487) performing the activities previously described.

Implementing the apparatus, systems, and methods disclosed herein may reduce an amount of AK context information required to be cached as an MS is handed off from one BS to another, without compromising security or introducing additional security risks. A cost savings may result from the decreased caching resource requirements.

Although the inventive concept may include embodiments described in the exemplary context of an IEEE standard 802.xx implementation (e.g., 802.11, 802.11a, 802.11b, 802.11E, 802.11g, 802.16, etc.), the claims are not so limited. Additional information regarding the IEEE 802.11a protocol standard may be found in IEEE Std 802.11a, Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications—High-speed Physical Layer in the 5 GHz Band (published 1999; reaffirmed Jun. 12, 2003). Additional information regarding the IEEE 802.11b protocol standard may be found in IEEE Std 802.11b, Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band (approved Sep. 16, 1999; reaffirmed Jun. 12, 2003). Additional information regarding the IEEE 802.11g protocol standard may be found in IEEE Std 802.11g™, IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 4: Further Higher Data Rate Extension in the 2.4 GHz Band (approved Jun. 12, 2003). Embodiments of the present invention may be implemented as part of any wired or wireless system. Examples may also include embodiments comprising multi-carrier wireless communication channels (e.g., orthogonal frequency division multiplexing (OFDM), discrete multitone (DMT), etc.) such as may be used within a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and like communication systems, without limitation.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A context control module, including:
   an uplink replay counter to track at least one packet sequence on an uplink;
   a downlink replay counter to track at least one packet sequence on a downlink; and
   an authentication key (AK) context cache coupled to both the uplink replay counter and the downlink replay counter to cache a subset of contents of at least one of the uplink replay counter or the downlink replay counter prior to performing a handoff at a mobile station (MS) from a first base station (BS) to a second BS, the cached subset of the contents of the at least one of the uplink replay counter or the downlink replay counter to be retrieved from the AK context cache upon performing a handoff of the MS back to the first BS.

2. The context control module of claim 1, wherein at least one of the uplink replay counter or the downlink replay counter comprises a packet number counter and a connection counter.

3. The context control module of claim 1, further including:
   packet exchange logic coupled to at least one of the uplink replay counter or the downlink replay counter to increment at least one of an uplink packet number counter as each packet is transmitted on the uplink or a downlink packet number counter as each packet is received on the downlink.

4. The context control module of claim 1, further including:
   handoff logic coupled to the AK context cache to increment an uplink connection counter and a downlink connection counter and to reset an uplink packet number counter and a downlink packet number counter upon each handoff of the MS, the handoff logic also to retrieve contents of the AK context cache upon the handoff of the MS back to the first BS.

5. The context control module of claim 4, further including:
AK derivation and verification logic coupled to the handoff logic to maintain an AK for as long as cryptographic material used to generate the AK persists and to verify messages received on the downlink for correct signatures.

6. A system, including:
an omnidirectional antenna to facilitate communications with a first BS and a second BS; and
a context control module operatively coupled to the omnidirectional antenna, the context control module comprising:
an uplink replay counter to track at least one packet sequence on an uplink;
a downlink replay counter to track at least one packet sequence on a downlink; and
an authentication key (AK) context cache coupled to both the uplink replay counter and the downlink replay counter to cache a subset of a contents of at least one of the uplink replay counter or the downlink replay counter prior to handing off the MS from the first BS to the second BS, the cached subset of the contents of the at least one of the uplink replay counter or the downlink replay counter to be retrieved from the AK context cache upon a handoff of the MS back to the first BS.

7. The system of claim 6, wherein at least one of the uplink replay counter or the downlink replay counter comprises a packet number counter and a connection counter.

8. A method, including:
at a mobile station (MS) in a wireless packet-switched network, caching a subset of contents of a first replay counter associating a first base station (BS) with the MS prior to performing a handoff from the first BS to a second BS, wherein a subset of contents of a second replay counter associating the MS with the first BS is cached at the first BS; and
at the MS, upon performing a handoff from the second BS back to the first BS, retrieving the subset of the contents of the first replay counter, wherein the subset of the contents of the second replay counter associating the MS with the first BS and cached at the first BS is retrieved by the first BS.

9. The method of claim 8, further including:
at the MS, performing a first replay prevention operation using the subset of the contents of the first replay counter as retrieved without requiring a fresh authentication sequence, wherein a second replay prevention operation is performed at the first BS without requiring a fresh authentication sequence, using the subset of the contents of the second replay counter associating the MS with the first BS and retrieved at the first BS.

10. The method of claim 8, wherein the fresh authentication sequence comprises an authentication, authorization, and accounting (AAA) session.

11. The method of claim 10, wherein the AAA session utilizes an extensible authentication protocol (EAP).

12. The method of claim 8, further including:
at the MS, performing a handoff from the first BS to the second BS, wherein handoff operations are also performed at the first BS and at the second BS;
at the MS, caching a subset of contents of a third replay counter associating the second BS with the MS prior to performing the handoff from the second BS back to the first BS, wherein a subset of contents of a fourth replay counter associating the MS with the second BS is cached at the second BS; and
at the MS, performing a handoff from the second BS back to the first BS, wherein handoff operations are also performed at the first BS and at the second BS.

13. The method of claim 12, wherein at least one of the first replay counter, the second replay counter, the third replay counter, or the fourth replay counter comprises at least one of an uplink packet number counter operating cooperatively with an uplink connection counter or a downlink packet number counter operating cooperatively with a downlink connection counter.

14. The method of claim 13, further including:
incrementing at least one of the uplink packet number counter following a packet transmission on an uplink or the downlink packet number counter following a packet reception on a downlink.

15. The method of claim 13, further including:
upon performing a handoff, incrementing at least one of the uplink connection counter or the downlink connection counter and reselling both the uplink packet number counter and the downlink packet number counter.

16. The method of claim 15, further including:
performing a fresh authentication sequence if a contents of at least one of the uplink connection counter or the downlink connection counter reaches a maximum packet count.

17. The method of claim 12, wherein at least one of the subset of the contents of the first replay counter, the subset of the contents of the second replay counter, the subset of the contents of third replay counter, or the subset of the contents of the fourth replay counter comprises a contents of an uplink connection counter and a contents of a downlink connection counter.

18. The method of claim 12, wherein at least one of the subset of the contents of the first replay counter, the subset of the contents of the second replay counter, the subset of the contents of third replay counter, or the subset of the contents of the fourth replay counter comprises a contents of a common connection counter.

19. The method of claim 12, further including:
at the MS, receiving a downlink message on a downlink, wherein the downlink message is created at least one of the first BS or the second BS by creating an authentication signature associated with the downlink message, appending the authentication signature to the downlink message, and transmitting the downlink message to the MS;
incrementing at least one of the first replay counter or the third replay counter at the MS, wherein at least one of the second replay counter at the first BS or the fourth replay counter at the second BS is incremented; and
verifying an authentication signature associated with the downlink message.

20. The method of claim 12, further including:
at the MS, creating an authentication signature associated with an uplink message to be transmitted;
appending the authentication signature to the uplink message;
transmitting the uplink message; and
incrementing at least one of the first uplink replay counter or the second uplink replay counter, wherein the uplink message is received at least one of the first BS or the second BS, wherein at least one of the second replay counter at the first BS or the fourth replay counter at the second BS is incremented, and wherein the uplink message is verified at least one of the first BS or the second BS.

21. An article comprising a memory having instructions stored therein, wherein the instructions, when executed by a processor, result in a machine performing:
- at a mobile station (MS) in a wireless packet-switched network, caching a subset of contents of a first replay counter associating a first base station (BS) with the MS prior to performing a handoff from the first BS to a second BS, wherein a subset of contents of a second replay counter associating the MS with the first BS is cached at the first BS; and
- at the MS, upon performing a handoff from the second BS back to the first BS, retrieving the subset of the contents of the first replay counter, wherein the subset of the contents of the second replay counter associating the MS with the first BS and cached at the first BS is retrieved by the first BS.

22. The article of claim 21, wherein the instructions, when executed by the processor, result in the machine further performing:
- at the MS, performing a first replay prevention operation using the subset of the contents of the first replay counter as retrieved without requiring a fresh authentication sequence, wherein a second replay prevention operation is performed at the first BS without requiring a fresh authentication sequence, using the subset of the contents of the second replay counter associating the MS with the first BS and retrieved at the first BS.

23. The article of claim 22, wherein the instructions, when executed by the processor, result in the machine further performing:
- at the MS, performing a handoff from the first BS to the second BS, wherein handoff operations are also performed at the first BS and at the second BS;
- at the MS, caching a subset of contents of a third replay counter associating the second BS with the MS prior to performing the handoff from the second BS back to the first BS, wherein a subset of contents of a fourth replay counter associating the MS with the second BS is cached at the second BS; and
- at the MS, performing a handoff from the second BS back to the first BS, wherein handoff operations are also performed at the first BS and at the second BS.

24. The article of claim 23, wherein the instructions, when executed by the processor, result in the machine further performing:
- at the MS, receiving a downlink message on a downlink, wherein the downlink message is formatted at least one of the first BS or the second BS by creating an authentication signature associated with the downlink message, appending the authentication signature to the downlink message, and transmitting the downlink message to the MS;
- incrementing at least one of the first replay counter or the third replay counter at the MS, wherein at least one of the second replay counter at the first BS or the fourth replay at the second BS is incremented; and
- verifying an authentication signature associated with the downlink message.

25. The article of claim 24, wherein the instructions, when executed by the processor, result in the machine further performing:
- at the MS, creating an authentication signature associated with an uplink message to be transmitted;
- appending the authentication signature to the uplink message;
- transmitting the uplink message; and
- incrementing at least one of the first uplink replay counter or the second uplink replay counter, wherein the uplink message is received at least one of the first BS or the second BS, wherein at least one of the second replay counter at the first BS or the fourth replay counter at the second BS is incremented, and wherein the uplink message is verified at least one of the first BS or the second BS.

* * * * *

UNITED STATES PATENT AND TRADEMARK OFFICE
CERTIFICATE OF CORRECTION

PATENT NO. : 7,706,799 B2 Page 1 of 1
APPLICATION NO. : 11/389322
DATED : April 27, 2010
INVENTOR(S) : Sanjay Bakshi et al.

It is certified that error appears in the above-identified patent and that said Letters Patent is hereby corrected as shown below:

In column 10, line 23, in Claim 15, delete "reselling" and insert -- resetting --, therefor.

In column 10, line 45, in Claim 19, after "created" insert -- at --.

In column 10, line 65, in Claim 20, after "received" insert -- at --.

In column 11, line 2, in Claim 20, after "verified" insert -- at --.

In column 12, line 11, in Claim 24, after "formatted" insert -- at --.

In column 12, line 33, in Claim 25, after "received" insert -- at --.

In column 12, line 37, in Claim 25, after "verified" insert -- at --.

Signed and Sealed this

Twenty-second Day of June, 2010

David J. Kappos
*Director of the United States Patent and Trademark Office*